(12) United States Patent
Lee

(10) Patent No.: US 9,921,303 B2
(45) Date of Patent: Mar. 20, 2018

(54) OBJECT DETECTION APPARATUS AND METHOD

(71) Applicant: HYUNDAI MOBIS Co., Ltd., Seoul (KR)

(72) Inventor: Jae Young Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 329 days.

(21) Appl. No.: 14/728,394

(22) Filed: Jun. 2, 2015

(65) Prior Publication Data

US 2016/0033628 A1    Feb. 4, 2016

(30) Foreign Application Priority Data

Jul. 29, 2014   (KR) .................. 10-2014-0096558

(51) Int. Cl.
*G01S 15/00*    (2006.01)
*G01S 7/529*    (2006.01)
(Continued)

(52) U.S. Cl.
CPC ............. *G01S 7/529* (2013.01); *G01S 7/527* (2013.01); *G01S 15/08* (2013.01); *G01S 15/10* (2013.01); *G01S 15/931* (2013.01)

(58) Field of Classification Search
USPC ......................................................... 367/98
See application file for complete search history.

(56) References Cited

U.S. PATENT DOCUMENTS 3,902,476 A * 9/1975 Hileman ................. A61B 8/08
                                                          345/20
4,475,398 A * 10/1984 Tjornehoj ............ G01N 29/032
                                                          324/99 D
(Continued)

FOREIGN PATENT DOCUMENTS

CN    102656055 A    9/2012
CN    102736081 A    10/2012
CN    103101493 A    5/2013

OTHER PUBLICATIONS

Yang, Wang, et al. "Proportional-Integral-Differential-Based Automatic Gain Control Circuit for Ultrasonic Ranging Systems." Measuring Technology and Mechatronics Automation (ICMTMA), 2013 Fifth International Conference on. IEEE, 2013.*
(Continued)

*Primary Examiner* — James R Hulka
*Assistant Examiner* — Jonathan D Armstrong
(74) *Attorney, Agent, or Firm* — NSIP Law

(57) ABSTRACT

Provided are an object detection apparatus and method. The object detection apparatus includes an amplifier configured to amplify a reflected ultrasonic wave signal with a variable gain, a gain controller configured to set the variable gain such that the reflected ultrasonic wave signal received in at least one predetermined time zone is amplified with a high gain, compared to in other time zones, a comparator configured to compare a signal on an envelope corresponding to the signal amplified by the amplifier with a predetermined threshold and output the signal on the envelope when the signal is greater than the threshold, a calculator configured to calculate an absolute value of a first-order differential value of the signal on the envelope, and a time at which a maximum of the absolute value of the first-order differential value is calculated, and a detector configured to detect an object using a third time, the third time being a time at which the maximum is calculated, before a second time, the second time being a time at which the signal greater than the threshold is output.

11 Claims, 13 Drawing Sheets

(51) Int. Cl.
  *G01S 15/08*     (2006.01)
  *G01S 15/93*     (2006.01)
  *G01S 7/527*     (2006.01)
  *G01S 15/10*     (2006.01)

(56) References Cited

U.S. PATENT DOCUMENTS

| | | | | |
|---|---|---|---|---|
| 4,596,144 | A * | 6/1986 | Panton | G01F 23/2962 |
| | | | | 73/290 V |
| 4,816,919 | A * | 3/1989 | Coates | H04N 5/23212 |
| | | | | 348/353 |
| 6,250,160 | B1 * | 6/2001 | Koch | G01B 17/025 |
| | | | | 73/597 |
| 6,314,055 | B1 * | 11/2001 | Foxlin | G01S 7/523 |
| | | | | 367/127 |
| 6,358,205 | B1 * | 3/2002 | Ustuner | G01S 7/52033 |
| | | | | 600/437 |
| 6,933,934 | B2 * | 8/2005 | Amemiya | A61B 8/4411 |
| | | | | 345/179 |
| 2004/0102919 | A1 | 5/2004 | Eckel et al. | |
| 2004/0138572 | A1 * | 7/2004 | Thiagarajan | A61B 7/04 |
| | | | | 600/508 |
| 2004/0246239 | A1 * | 12/2004 | Knowles | G06F 3/0436 |
| | | | | 345/177 |
| 2005/0094751 | A1 * | 5/2005 | Serizawa | H03G 5/005 |
| | | | | 375/346 |
| 2010/0152600 | A1 * | 6/2010 | Droitcour | A61B 5/05 |
| | | | | 600/534 |
| 2011/0040502 | A1 * | 2/2011 | Furmanski | A61M 1/3653 |
| | | | | 702/51 |
| 2012/0263018 | A1 | 10/2012 | Yamaguchi et al. | |
| 2013/0033964 | A1 | 2/2013 | Karl | |
| 2016/0033628 | A1 * | 2/2016 | Lee | G01S 7/527 |
| | | | | 367/98 |

OTHER PUBLICATIONS

Toochinda, Varodom. Digital PID Controllers. http://www.controlsystemslab.com. Jun. 2011.*
Vucic, Mladen, and Marko Butorac. "All-digital high-dynamic automatic gain control." Circuits and Systems, 2009. ISCAS 2009. IEEE International Symposium on. IEEE, 2009.*
Chinese Office Action issued May 22, 2017 in Counterpart Chinese Application No. 201510427430.6 (7 pages in Chinese).

* cited by examiner

RELATED ART

RELATED ART

RELATED ART

RELATED ART

RELATED ART

OBJECT DETECTION APPARATUS AND METHOD

CROSS-REFERENCE TO RELATED APPLICATIONS

This application claims priority under 35 U.S.C. § 119 to Korean Patent Application No. 10-2014-0096558, filed on Jul. 29, 2014, the disclosure of which is incorporated herein by reference in its entirety.

TECHNICAL FIELD

The present invention relates to an object detection apparatus and method, and more particularly, to an object detection apparatus and method in which reflected waves may be amplified with a variable gain to detect an object.

BACKGROUND

For vehicular ultrasound devices of the related art, as shown in FIG. 1, a transducer converts an electric signal generated by a pulse generation device into ultrasonic waves and transmits the ultrasonic waves, and the ultrasonic waves transmitted by the transducer are reflected by a surface of an object and then converted back by the transducer into an electric signal.

The electric signal, which has a level of a few microvolts (uV), obtained through the conversion by the transducer is amplified by an amplifier (Amp) to a signal having a level of a few volts (V) before being converted into a digital signal. However, since a vehicular ultrasonic wave signal has a frequency ranging from 20 kHz to 100 kHz, which is equal to or greater than an audio frequency, the amplified signal is filtered by a band-pass filter to increase a signal-to-noise ratio of a corresponding frequency band.

Subsequently, an envelope detector calculates an envelope of the filtered signal, and a ToF calculation and a comparator compare a signal value of the calculated envelope with a threshold.

If a result of the comparison is that the signal value of the envelope is greater than the threshold, it is determined that there is an object. In this case, the ToF calculation calculates a distance from the object using a speed of the ultrasonic waves and a time taken until an envelope signal equal to or greater than a threshold is received after a transmission time.

However, as described above, the vehicular ultrasonic wave signal is in a frequency band adjacent to an audible frequency band and is subject to interference caused by harmonic components of noise in the general environment.

Accordingly, when a level of the harmonic components of ambient environmental noise is equal to or greater than a threshold, the noise may be recognized and detected as an object although there is no object.

In order to reduce such a false alarm, vehicular ultrasound devices of the related art pass through two sensing processes to determine that there is an object only when two pieces of sensing information are the same.

That is, vehicular ultrasound devices of the related art should sense a road curb of a height that may damage a vehicle bumper. However, as shown in FIG. 3, since a road curb positioned in a short distance lies outside a vertical beam pattern, signal attenuation is great, and thus an amplifier having a high gain should be used to detect an object.

When an amplifier having a high gain is used, a first transmission signal is reflected by an object having a high reflection signal such as a wall positioned at a remote distance and received at a threshold or higher when a second transmission signal is transmitted or received.

In other words, as shown in FIG. 4, since time of flight (TOF) 1 of the first transmission signal is not equal to TOF 2 of the second transmission signal, an alarm may not be provided although there is an object.

In addition, if a vehicle is started up when an outdoor temperature is low, an air temperature layer may be formed by an exhaust gas which has a temperature higher than the outdoor temperature. In this case, as shown in FIG. 5, vehicle ultrasound devices of the related art amplify an ultrasonic wave signal reflected by the air temperature layer with a high gain.

Accordingly, when the ultrasonic wave signal reflected by the air temperature layer is equal to or greater than a threshold, the ultrasonic wave signal may be misrecognized as an object.

SUMMARY

Accordingly, the present invention provides an object detection apparatus and method that may increase robustness to the environment without interference caused by an object having a great reflected signal (e.g., a remote wall) and influence caused by the exhaust gas.

The present invention also provides an object detection apparatus and method that may reduce an occurrence frequency of distortion in a position of an object due to a change in a variable gain curve.

The present invention also provides an object detection apparatus and method that may reduce implementation cost and complexity using a comparatively simple structure.

In one general aspect, an object detection apparatus includes: an amplifier configured to amplify a reflected ultrasonic wave signal with a variable gain; a gain controller configured to set the variable gain such that the reflected ultrasonic wave signal received in at least one predetermined time zone is amplified with a high gain, compared to in other time zones; a comparator configured to compare a signal on an envelope corresponding to the signal amplified by the amplifier with a predetermined threshold and output the signal on the envelope when the signal is greater than the threshold; a calculator configured to calculate an absolute value of a first-order differential value of the signal on the envelope, and a time at which a maximum of the absolute value of the first-order differential value is calculated; and a detector configured to detect an object using a third time, the third time being a time at which the maximum is calculated, before a second time, the second time being a time at which the signal greater than the threshold is output.

The at least one time zone may include a time zone at which there are reflected waves that are reflected from a target object intended to be sensed.

The calculator may include: a first summer configured to sequentially receive signals on the envelope and output a current differential signal, the current differential signal being a result obtained by differentiating between a current input signal and a previous input signal; a first storage configured to store the previous input signal, a second storage configured to store a previous differential signal, the previous input signal being a result obtained by differentiating between the previous input signal and a signal before the previous input signal; a first comparator configured to, when the current differential signal is greater than the previous differential signal, output the current differential signal; a third storage configured to store a larger one between the previous differential signal and the current differential signal; and a fourth storage configured to store the third time, the third time being a time at which the larger signal is stored, and output the third time when the comparator outputs the signal greater than the threshold.

The object detection apparatus may further include a second comparator configured to, when the current differential signal with a predetermined offset added thereto is greater than the previous differential signal, reset the third time stored in the third storage.

The gain controller may use, as the variable gain, a value on a gain curve formed by linearly interpolating a slope value of a gain for each predetermined section.

The gain controller may set a length of the predetermined section as a power of 2.

The gain controller may set the variable gain using the following equation:

$$\text{Gain} = \text{Static gain} + \int_{t_k}^{t_{k+1}} \left\{ \frac{\alpha(t_{k+1}) - \alpha(t_k)}{t_{k+1} - t_k}(t - t_k) + \alpha(t_k) \right\} dt.$$

where a static gain is an amplification gain of a reflected wave signal in the other time zones, t is a current time, $t_k$ is a time corresponding to a previous section of the current time in the predetermined section, $t_{k+1}$ is a time corresponding to a next section in the predetermined section, $\alpha(t_k)$ is a slope value of a gain at time $t_k$, and $\alpha(t_{k+1})$ is a slope value of a gain at time $t_{k+1}$.

The gain controller may include: a counter configured to measure a current time and be reset when the measured current time corresponds to a section length of a predetermined gain; a comparator configured to output a signal and reset the counter when the current time is greater than the section length; a state machine configured to be state-transited upon recognizing the output of the comparator; a plurality of multiplexers each configured to output the predetermined gain including a gain for a previous section of the current time and a gain for a next section of the current time, corresponding to the output of the state machine; a first summer configured to perform subtraction of the gains of the plurality of multiplexers; a shift register configured to perform a shift operation on an output of the summer; a multiplier configured to multiply the current time with an output of the shift register; a second summer configured to add the gain for the previous section and an output of the multiplexer; a third summer configured to add an output of the second summer and a previously calculated variable gain to calculate the variable gain to be used at the current time; and a storage configured to store the variable gain to be used at the current time such that the variable gain is used for subsequent operations of the third summer.

In another general aspect, an object detection method including: amplifying a reflected ultrasonic wave signal with a variable gain, the reflected ultrasonic wave signal being amplified with a high gain in at least one time zone in which there are reflected waves from an object intended to be sensed, compared to other time zones; comparing a signal on an envelope corresponding to the amplified reflected wave signal with a predetermined threshold; outputting the signal on the envelope when the signal is greater than the threshold; calculating a maximum of an absolute value of a first-order differential value of the signal on the envelope; and detecting an object using a third time, the third time being a time at which the maximum is calculated, before a second time, the second time being a time at which the signal greater than the threshold is output.

The amplifying may include using, as the variable gain, a value on a gain curve formed by linearly interpolating a slope value of a gain for each predetermined section.

The calculating may include: sequentially receiving signals on the envelope and outputting a current differential signal, the current differential signal being a result obtained by differentiating between a current input signal and a previous input signal; storing the previous input signal in a first storage, storing a previous differential signal in a second storage, the previous input signal being a result obtained by differentiating between the previous input signal and a signal before the previous input signal; when the current differential signal is greater than the previous differential signal, outputting the current differential signal; storing a larger one between the previous differential signal and the current differential signal in a third storage; storing the third time in a fourth storage, the third time being a time at which the larger signal is stored; and outputting the third time when the signal greater than the threshold value is output.

The object detection method may further include: adding the current differential signal to a predetermined offset; and when the current differential signal with a predetermined offset added thereto is greater than the previous differential signal, resetting the third time stored in the third storage.

Other features and aspects will be apparent from the following detailed description, the drawings, and the claims.

DETAILED DESCRIPTION OF EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 6:
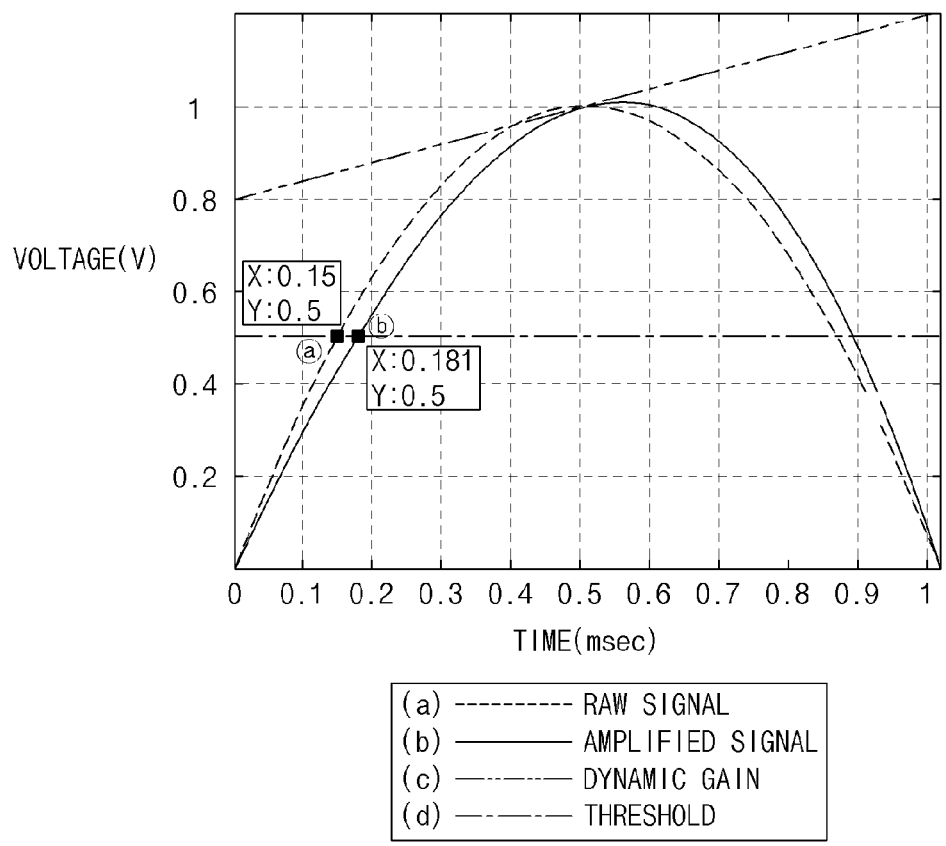
FIG. 6 is a graph showing a reflected wave signal when an object detection apparatus using ultrasound performs static and dynamic gain control on an amplifier according to the related art.

Before providing a detailed description of embodiments of the present invention, a static gain control method and a dynamic gain control method of the related art will be described with reference to FIGS. 1 to 6. FIG. 6 is a graph showing a reflected wave signal when an object detection apparatus using ultrasound performs static and dynamic gain controls on an amplifier of an object detection apparatus according to the related art. Here, the static gain and dynamic gain controls are methods of controlling a gain of an amplifier of FIG. 1 (Amp), and the reflected wave signal may be an output of an envelope detector of FIG. 1 (Envelope Detector).

Figure 1:
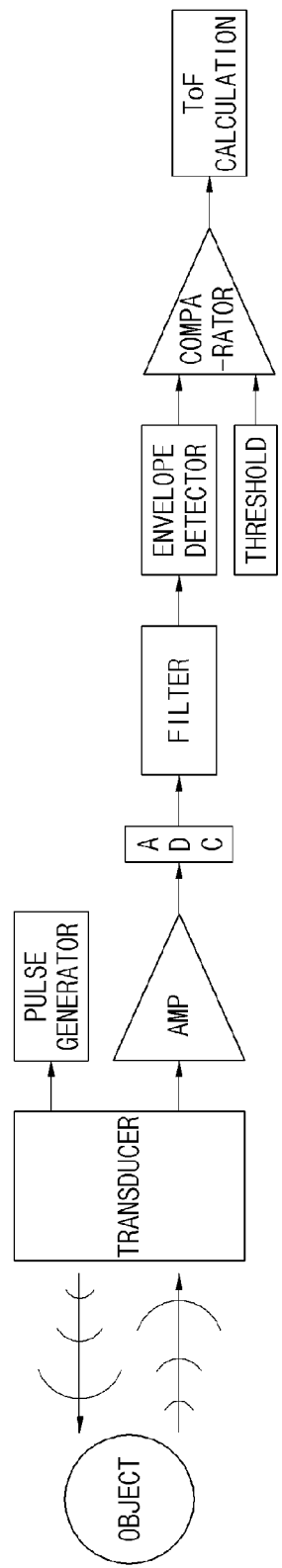
FIG. 1 is a block diagram showing an object detection apparatus using ultrasound according to the related art.
Figure 2:
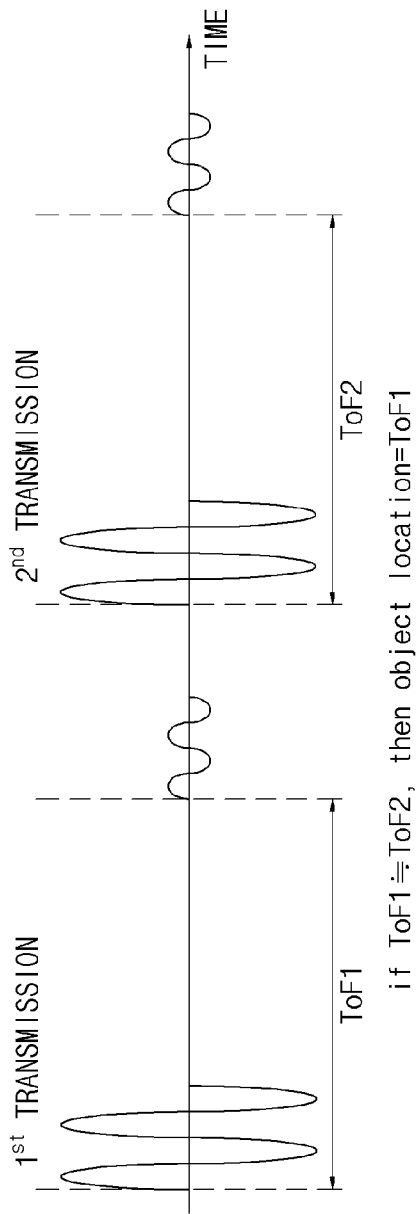
FIG. 2 is a view showing a time of flight (ToF) of an object detection apparatus using ultrasound according to the related art.
Figure 3:
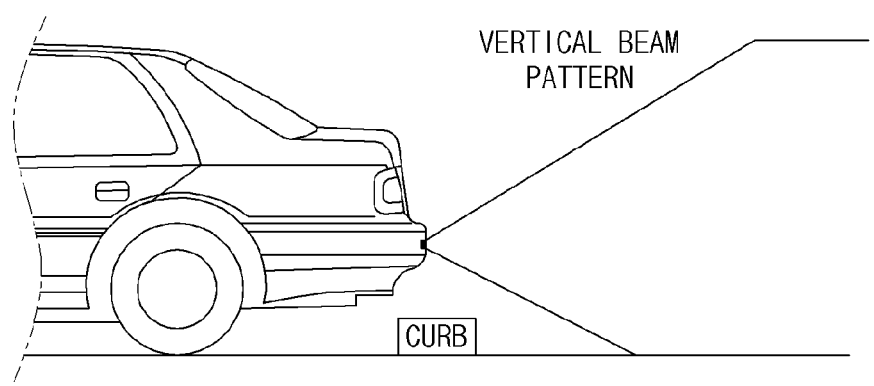
FIG. 3 is a diagram showing a time of flight (ToF) of an object detection apparatus using ultrasound according to the related art.
Figure 4:
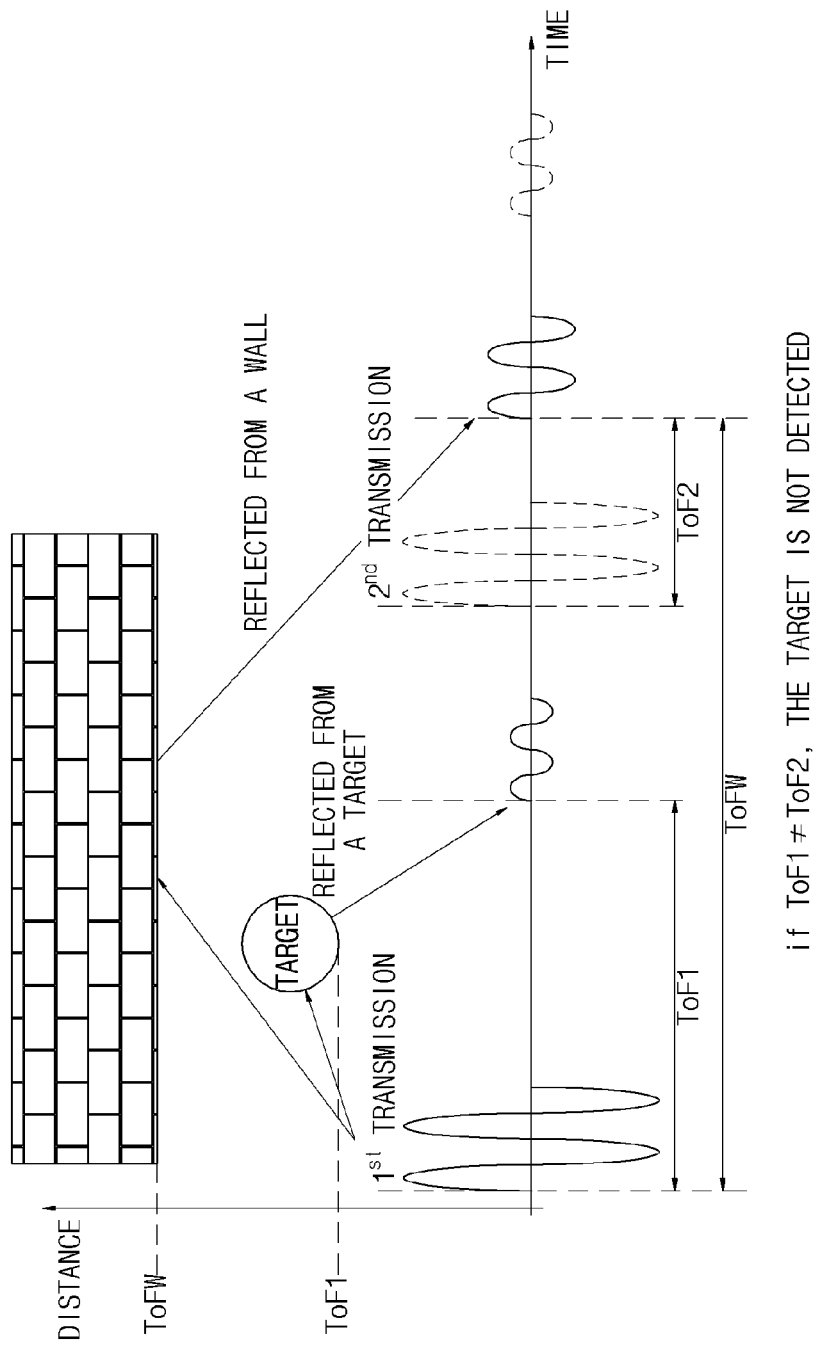
FIG. 4 is a diagram for describing a problem of object misrecognition of an object detection apparatus using ultrasound according to the related art.
Figure 5:
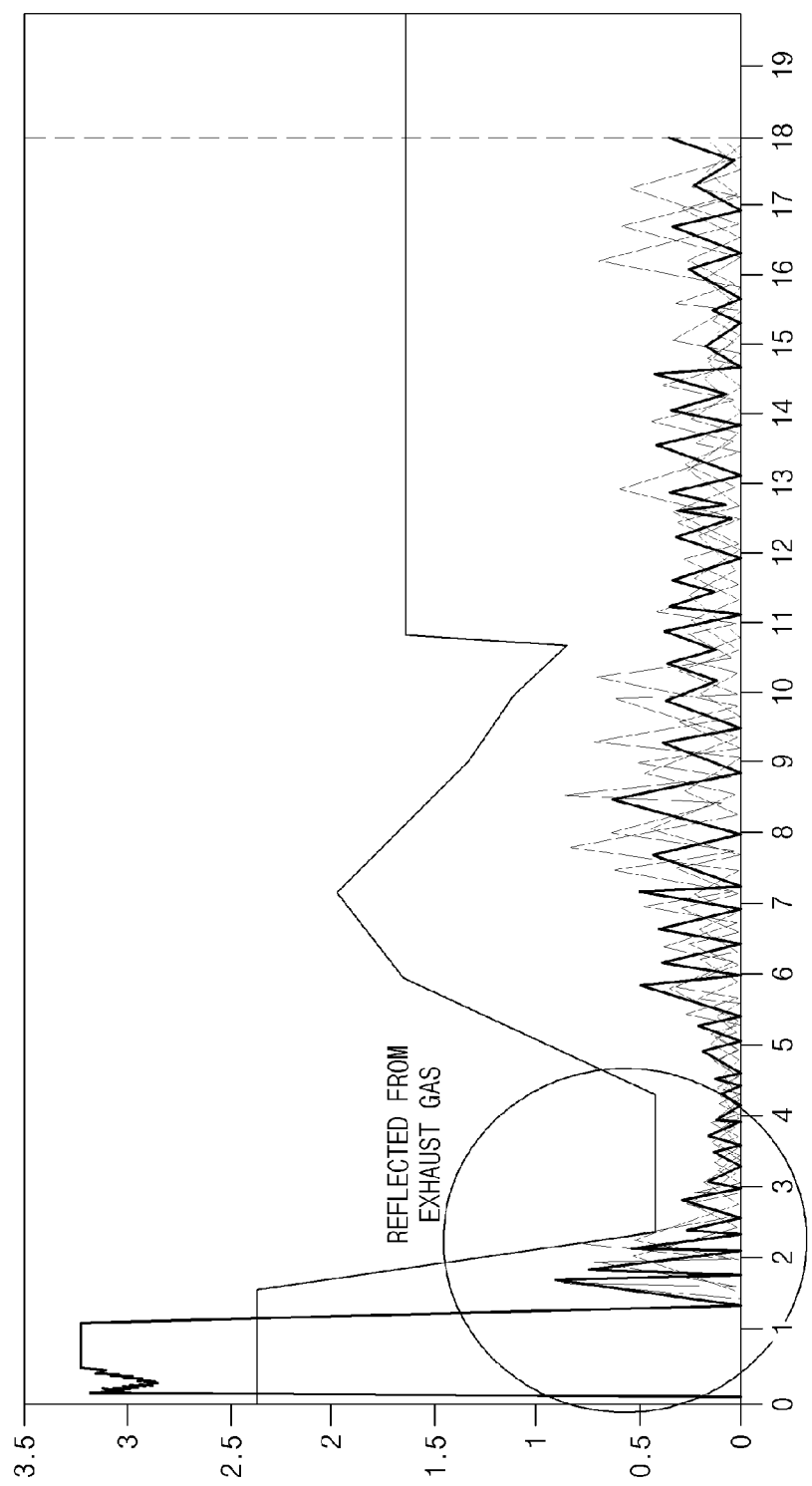
FIG. 5 is a diagram showing a reflected wave signal by an exhaust gas in an object detection apparatus using ultrasound according to the related art.

In FIG. 6, line (a) is a reflected wave signal when a static gain is used, line (b) is a reflected wave signal when a dynamic gain is used, line (c) is a dynamic gain of an amplifier with respect to time, and line (d) is a threshold of object detection (threshold of FIG. 1 being 0.5 V in FIG. 6).

As described above, an object detection apparatus of the related art detects a position of an object using a time when the reflected wave signal is greater than the threshold. A case in which the object detection apparatus of the related art detects an attached object (that is, the position of the object is at 0 ms).

As shown in point ⓐ of FIG. 6, the object detection apparatus using the static gain of the related art uses 0.15 ms, which is a time of exceeding the threshold of 0.5 V, to calculate the distance to the object as 2.55 cm (=0.15 ms×340 m/s÷2).

However, since there is a distance offset between an actual position and a detected position of the object, the object detection apparatus of the related art compensates the distance offset (here, 2.55 cm) for the detected position of the object.

On the contrary, as shown in point ⓑ of FIG. 6, the object detection apparatus using the dynamic gain of the related art uses 0.181 ms, which is a time of exceeding the threshold of 0.5 V, to calculate the distance to the object as 3.08 cm (=0.181 ms×340 m/s÷2). That is, a detection error of an additional 0.53 cm occurs when the dynamic gain is used, compared to when the static gain is used.

However, since such a detection error varies depending on a gain curve used for the dynamic gain, it is difficult that a specific offset is compensated for the detection error. Furthermore, when the gain curve changes rapidly, the error value may further increase.

In order to prevent such a problem, according to an embodiment of the present invention, an object is detected using a first-order differential value of an amplified signal and a threshold.

The dynamic gain control of the amplifier in the related art is used to compensate for an image that is darkened in a medical ultrasound apparatus. Specifically, the dynamic gain control of the medical ultrasound apparatus is used to make image brightness levels of the entire area at the same level. Accordingly, the medical ultrasonic apparatus applies a monotone increasing function to the dynamic gain control and stores a gain varying with depth in a memory. Thus, the dynamic gain control of the related art requires high complexity and is difficult to apply to a system with a limited memory capacity.

However, according to an embodiment of the present invention, the dynamic gain control may be configured as a comparatively simple structure and implemented in a single semiconductor chip, thereby having low complexity.

Figure 7:
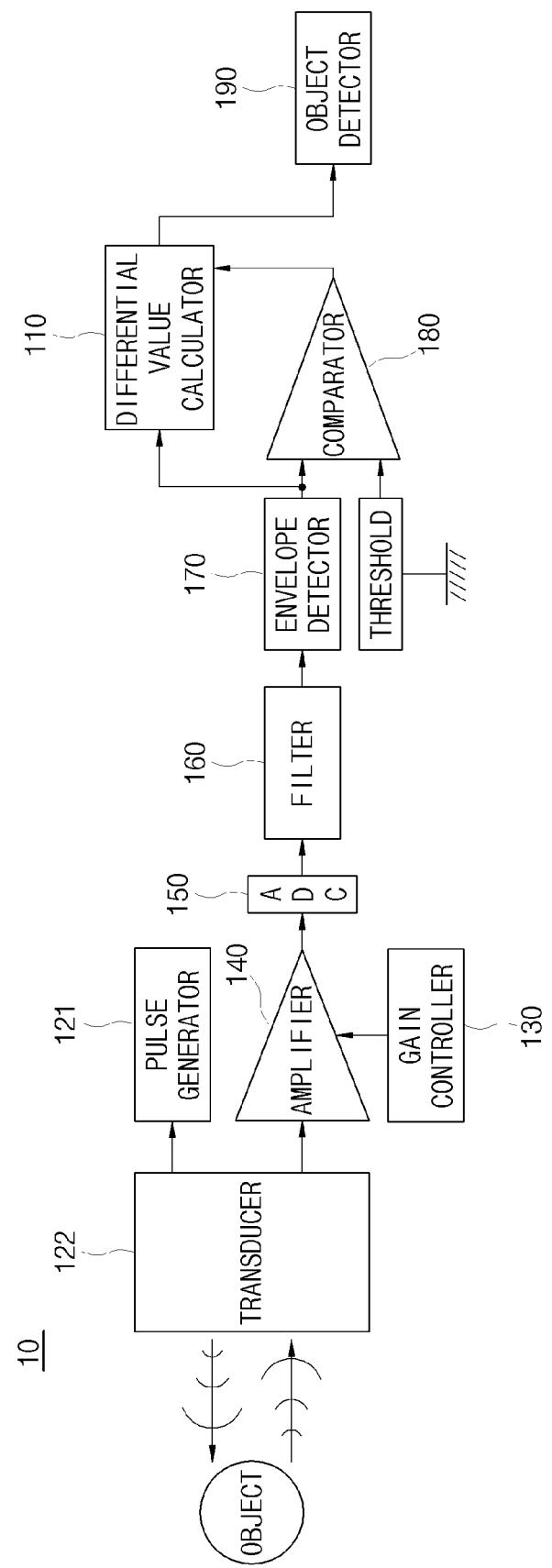
FIG. 7 is a block diagram showing an object detection apparatus according to an embodiment of the present invention.
Figure 8:
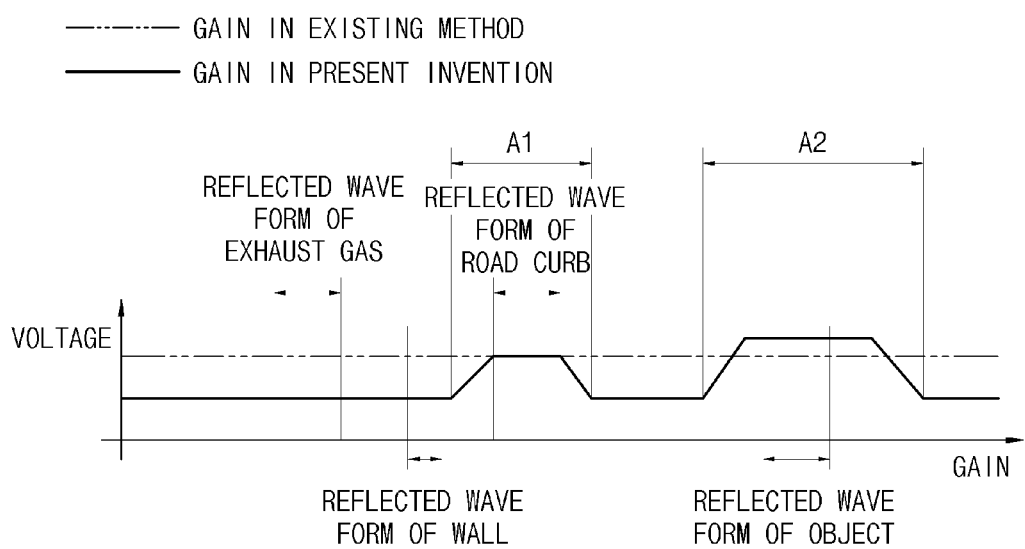
FIG. 8 is a graph showing a variable gain according to an embodiment of the present invention.
Figure 9:
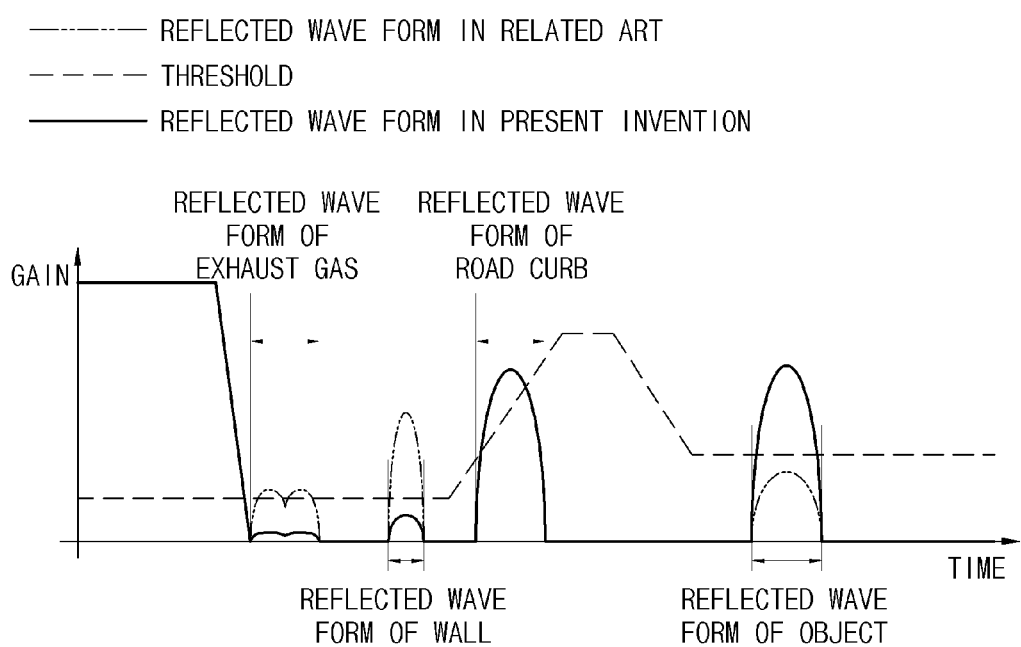
FIG. 9 is a graph showing a reflected wave form according to an embodiment of the present invention.

An object detection apparatus according to an embodiment of the present invention will be described below with reference to FIGS. 7 to 9. FIG. 7 is a block diagram showing an object detection apparatus according to an embodiment of the present invention, FIG. 8 is a graph showing a variable gain according to an embodiment of the present invention, and FIG. 9 is a graph showing a reflected wave form according to an embodiment of the present invention.

As shown in FIG. 7, an object detection apparatus 10 according to an embodiment of the present invention includes a pulse generator 121, a transducer 122, an amplifier 140, a gain controller 130, an AD converter 150, a filter 160, an envelope detector 170, a comparator 180, a differential value calculator 110, and an object detector 190.

The pulse generator 121 generates and provides any electric signal to the converter 122.

The transducer 122 converts the electric signal provided by the pulse generator 121 into ultrasonic waves and then transmits the ultrasonic waves. Subsequently, the transducer 122 receives and converts reflected waves back into the electric signal.

The amplifier 140 amplifies the electric signal obtained through the conversion by the transducer 122 with a variable gain, according to the control of the gain controller 130.

The gain controller 130 controls the variable gain of the amplifier 140. Specifically, the gain controller 130 sets the variable gain to higher than a first value (e.g., G1 in FIG. 8) in at least one time zone in which an obstacle is sensed and sets the variable gain to lower than the first value in the other time zones. Here, through a plurality of experiments in an environment in which the object detection apparatus 10 is applied, it can be seen that the at least one time zone may be a zone in which an ambient object intended to be detected has been detected a predetermined number of times or more. That is, the at least one time zone includes a time zone in which there are the reflected waves, which are reflected by the object to be sensed.

Referring to FIG. 8, the gain controller 130 may perform control such that a gain of the amplifier 140 is a first variable gain in first zone A1 in which a reflected wave form is identified from a road curb which is intended to be sensed and may perform control such that the gain of the amplifier 140 is a second variable gain in second zone A2 in which a reflected wave form is identified from an ambient object.

In addition, the gain controller 130 may perform control such that the gain of the amplifier 140 is first value G1, which is a static gain, in the other zones. In this case, the gain controller 130 identifies pre-stored gain slope values of a plurality of sections and controls the variable gain of the amplifier 140 using a gain curve calculated by linearly interpolating the gain slope value for each section. This will be described later with reference to FIGS. 12 and 13.

The AD converter 150 converts the electric signal (analog signal) amplified with a variable gain by the amplifier 140 into a digital signal.

The filter 160 band-pass filters the digital signal obtained through the conversion by the A/D converter 150 to increase a signal-to-noise ratio.

The envelope detector 170 calculates an envelope corresponding to the signal obtained through filtering by the filter 160.

The comparator 180 receives a signal on the envelope and checks whether an amplitude of the received signal is greater than a threshold.

The differential value calculator 110 calculates a first-order differential value of the signal on the envelope and outputs a time after a first time and before a second time (hereinafter referred to as a third time) at which a maximum of the first-order differential value is detected. Here, the first time is a transmission time of ultrasonic waves and the second time is a reception time of a signal on the envelope having an amplitude greater than the threshold.

The object detector 190 calculates a distance to the object using the speed of the ultrasonic waves and the time required between the first time and the third time, which is expressed as Equation (1) below:

$$\text{Distance to object} = \frac{ultrasonic speed \times (3^{rd} \text{ time} - 1^{st} \text{ time})}{2}.$$

Referring to FIG. 9, it can be seen that, in an output of the amplifier 140 with a dynamic gain according to an embodiment of the present invention, reflected waves from an exhaust gas or a wall (ambient noise) has an amplitude less than a threshold and reflected waves from a road curb or an object intended to be sensed has an amplitude equal to or greater than the threshold. Furthermore, it can be seen that an embodiment of the present invention is robust to an experimental change because an amplitude difference between the reflected wave by the ambient noise and the reflected wave by the object intended to be sensed is great.

According to an embodiment of the present invention, it is possible to overcome limitations of an existing object detection apparatus, such as interference caused by an object having a great reflected signal (e.g., a remote wall) and influence caused by the exhaust gas, and to increase robustness to the environment.

Figure 10:
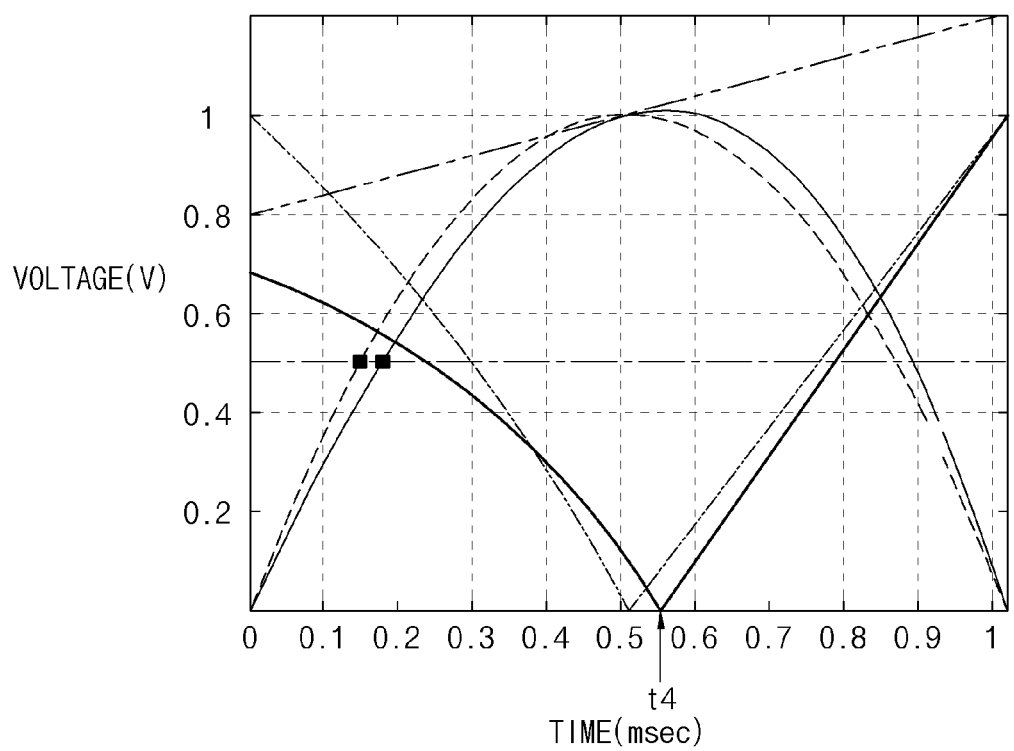
FIG. 10 is a graph showing a signal form of an object detection apparatus according to an embodiment of the present invention.

Various signal forms of an object detection apparatus according to an embodiment of the present invention will be described below with reference to FIG. 10. FIG. 10 is a graph showing a signal form of an object detection apparatus according to an embodiment of the present invention. Here, it is assumed that an object to be detected is positioned at 0 ms.

In FIG. 10, line (e) indicates a signal on an envelope when a static gain is used, and line (f) indicates a signal on an envelope when a variable gain is used. In addition, line (g) indicates a variable gain, line (h) indicates a threshold, line (i) indicates an absolute value of a first-order differential value when the statistic gain is used, and line (j) indicates an absolute value of a first-order differential value when the dynamic gain is used. Here, the signal on the envelope may be an output of the envelope detector 170.

As shown in FIG. 10, when the determination is performed on the object only using the reference value, a time (about 0.15 ms) when line (e) and line (h) are intersected and a time (about 0.18 ms, hereinafter referred to as a "second time") when line (f) and line (h) are intersected are each determined as a position of the object. When the position of the object is determined only using the threshold, a point different from an actual position of the object may be recognized as the position of the object.

However, viewing absolute values of first-order differential values of lines (i) and (j) of FIG. 10, maximums of the absolute values of the first-order differential values may be detected at 0 ms before the second time. When the object may be detected based on the first-order differential value, it can be seen that the object may be detected regardless of whether a variable gain is applied.

Figure 11:
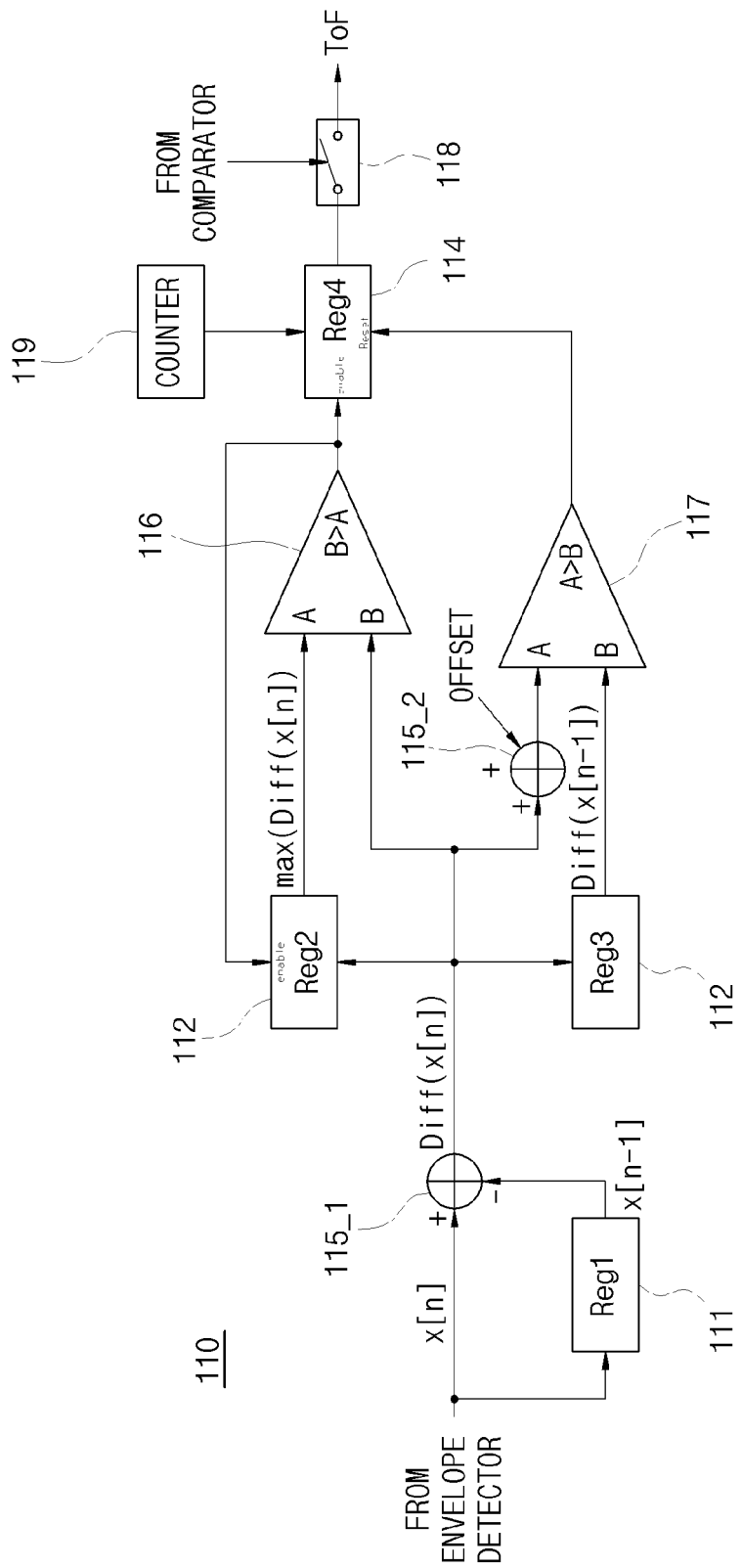
FIG. 11 is a block diagram showing a calculator according to an embodiment of the present invention.

A calculator that calculates a time position at which a maximum of an absolute value of a first-order differential value according to an embodiment of the present invention will be described below with reference to FIG. 11. FIG. 11 is a block diagram showing a calculator according to an embodiment of the present invention. In FIG. 11, an input signal of the differential value calculator 110 is a signal of an envelope that is output from the envelope detector 170. The output signal is output at the third time, that is, at a time when the maximum of the absolute value of the first-order differential value of the input signal is detected, before the second time.

As shown in FIG. 11, the differential value calculator 110 according to an embodiment of the present invention includes a first register 111, a second register 112, a third register 113, a fourth register 114, a first summer 115_1, a second summer 115_2, a first comparator 116, a second comparator 117, a counter 119, and a switch 118.

The first register 111 receives an nth signal x[n] and outputs an (n−1)th signal x[n−1].

The first summer 115_1 adds the nth signal x[n] and a negative value of the (n−1)th signal x[n−1]. That is, the first summer 115_1 outputs a differential signal x[n]−x[n−1] between the nth signal x[n] and the (n−1)th signal x[n−1].

The second register 112 receives an nth differential signal and stores a maximum among differential signals that have been received. That is, the second register 112 stores the nth differential signal when the nth differential signal {Diff(x[n])=B} being a current differential signal is greater than a previously stored differential signal {max(Diff(x[n])=A}. Here, an initial value of the second register 112, that is, an initial value of max(Diff(x[n]) may be 0.

The comparator 116 outputs "TRUE" when the nth differential signal {Diff(x[n])=B} is greater than the previously stored differential signal {max(Diff(x[n]))=A}; otherwise the first comparator 116 outputs "FALSE." Here, TRUE may indicates a digital signal of "1" and FALSE may indicates a digital signal of "0."

The third register 113 stores the previous differential signal, that is, the (n−1)th differential signal Diff(x[n−1]).

The second summer 115_2 adds an offset to the nth differential signal. Here, the offset may be a calibration value. Specifically, the offset may be a value that is set, through a plurality of experiments, in consideration of a degree to which the value of the nth differential signal increases when the reflected waves from the object are affected by noise.

The second comparator 117 outputs the (n−1)th differential signal corrected by the offset, which is greater than the (n−1)th differential signal. Thus, the third time stored in the fourth register 114 may be reset. That, as in time t4 of FIG.

10, in a section where a differential signal increases after the maximum, an object is not detected. Furthermore, although the maximum of the absolute value of the first-order differential value is detected, the maximum is not detected from the reflected waves of the object, and thus the fourth register 114 is reset. However, even before time t4, the differential signal may temporarily increase due to noise while the differential signal decreases. In this case, a certain offset is added to the nth differential signal such that the register 114 is not reset.

The counter 119 is driven to check a time (third time) at which the maximum of the absolute value of the first differential value is detected after the transmission time (first time) of the ultrasonic waves. That is, the counter 119 measures a current time.

When the fourth register 114 receives "TRUE" from the first comparator 116 at a time when the absolute value of the first-order differential value is the maximum, the fourth register 114 is enabled to check the current time (third time) from the counter 119 and store the current time. Furthermore, the fourth register 114 outputs the third time when the switch 118 is short-circuited.

When the output of the comparator 180 of FIG. 7 is 1, the switch 118 is short-circuited to deliver the third time from the fourth register 114 to the object detector 190.

On the contrary, when the nth differential signal is less than the previous differential signal by a predetermined offset or more, the fourth register 114 is reset.

An example in which the differential value calculator 110 outputs the third time upon receiving the second time from the comparator 180 has been described. However, unlike this, the differential value calculator 110 may output the third time whenever the maximum of the absolute value of the first differential value is detected. In this case, it will be appreciated that the object detector 190 may check the object using the third time upon checking the second time. In this case, the differential value calculator 110 may not include the switch 118.

According to an embodiment of the present invention, a maximum of the absolute value of the first-order differential value and the calculation time of the maximum may be checked by a comparatively simple structure including three storages, two adders, and two comparators. Accordingly, it may be possible to reduce implementation complexity and save implementation cost.

As described above, it is preferable that an embodiment of the present invention is implemented in a single semiconductor chip, for example, a vehicle parking assist device. Thus, a variable gain control method applied to a medical ultrasound device that uses a large-scale memory is difficult to be used without modification. Furthermore, the variable gain according to an embodiment of the present invention may involve a rapid change in gain, thus further increasing distortion of the position of the object.

In order to overcome this limitation, according to an embodiment of the present invention, it is possible to control the variable gain through a continuous gain curve by storing a slope value of a gain for each designated time and utilizing a value obtained by interpolating the stored slope value when the variable gain is applied.

Figure 12:
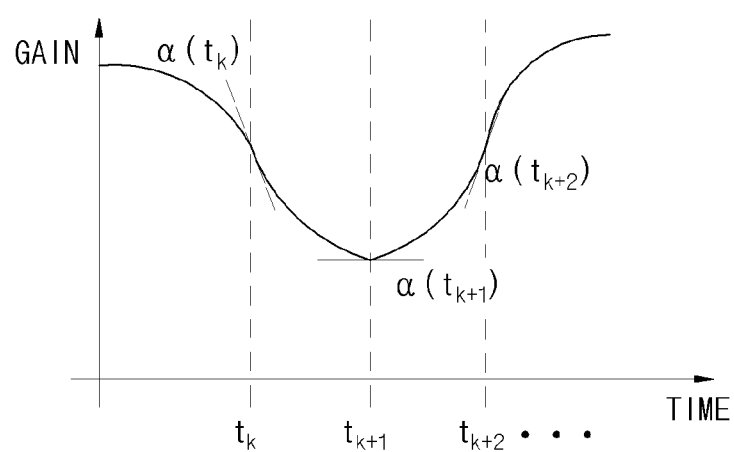
FIG. 12 is a graph showing a variable gain curve according to an embodiment of the present invention.
Figure 13:
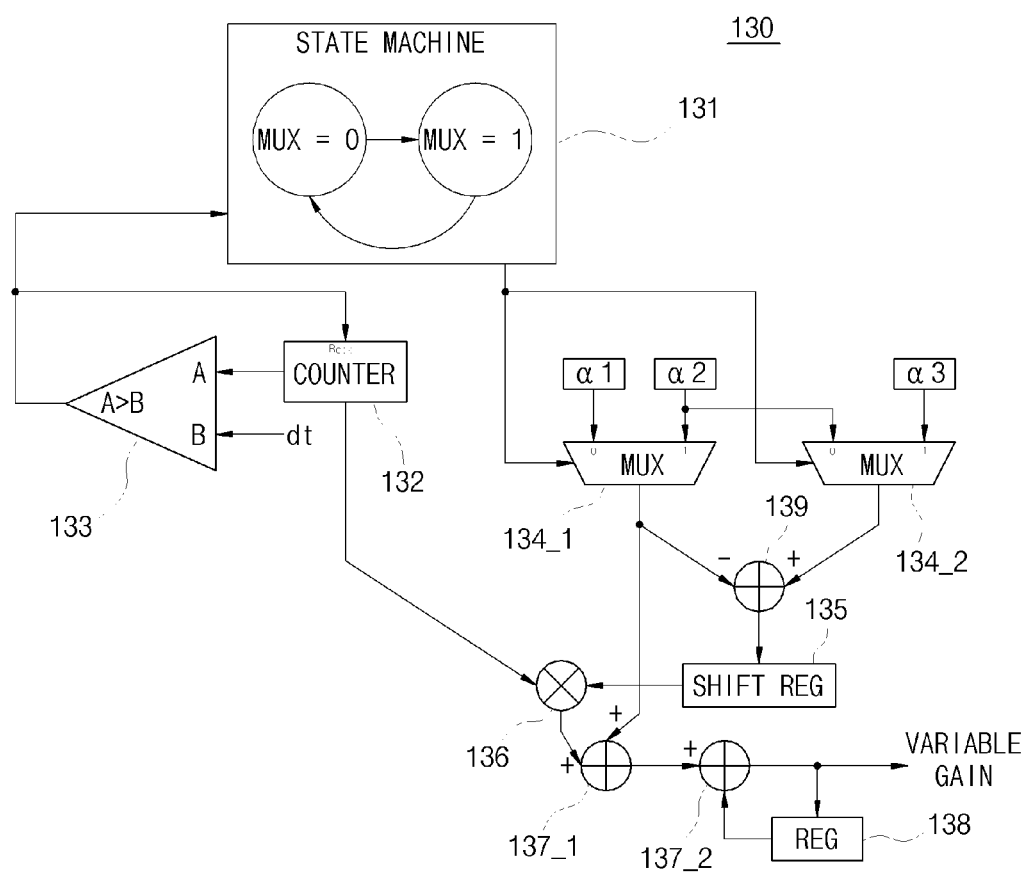
FIG. 13 is a block diagram showing a gain controller according to an embodiment of the present invention.

A gain controller according to an embodiment of the present invention will be described below with reference to FIGS. 12 and 13. FIG. 12 is a graph showing a variable gain curve according to an embodiment of the present invention, and FIG. 13 is a block diagram showing a gain controller according to an embodiment of the present invention. In FIG. 12, a slope value of a gain at time $t_k$ is $\alpha_1$, a slope value of a gain at time $t_{k+1}$ is $\alpha_2$, and a slope value of a gain at time $t_{k+2}$ is $\alpha_3$. Here, dt indicates $t_{k+1}-t_k$ and is $2^n$ (n is a positive integer).

As shown in FIG. 12, the gain controller according to an embodiment of the present invention a continuous curve form obtained by interpolating a gain for each section. In addition, the reflected signal from the object is not rapidly changed. Thus, according to an embodiment of the present invention, when an object is estimated based on the first-order differential value, an accurate position of the object may be calculated.

The variable gain applied by the gain controller 130 of the present invention to the amplifier 140 at any time is expressed as Equation (2) below (Here, the statistic gain may be equal to G1 of FIG. 8):

$$\text{Gain} = \text{Static gain} + \int_{t_k}^{t_{k+1}} \left\{ \frac{\alpha(t_{k+1}) - \alpha(t_k)}{t_{k+1} - t_k}(t - t_k) + \alpha(t_k) \right\} dt.$$

where the static gain is an amplification gain (G1 of FIG. 9) of the reflected wave signal with respect to a time zone in which a target is not included, t is a current time, $t_k$ is a time corresponding to a previous section of the current time within the predetermined section, $t_{k+1}$ is a time corresponding to a next section within the predetermined section, $\alpha(t_k)$ is a slope value of a gain at time $t_k$, and $\alpha(t_{k+1})$ is a slope value of a gain at time $t_{k+1}$.

As shown in FIG. 13, the gain controller 130 according to an embodiment of the present invention includes a state machine 131, a counter 132, a shift register 135, a first multiplexer 134_1, a second multiplexer 134_2, a comparator 133, a multiplier 136, a storage 138, an upper summer 139, a left summer 137_1, and a right summer 137_2.

The counter 132 measures a current time t and is reset whenever the current time becomes a section length ($dt=t_{k+1}-t_k$ or $t_{k+2}-t_k+1$) of a predetermined gain.

The comparator 133 outputs a signal when a current time calculated by the counter 132 is greater than the predetermined section length of the gain.

The state machine 131 is state-transited upon recognizing an output of the comparator 133.

The first and second multiplexers 134_1 and 134_2 outputs a predetermined gain including a gain for a previous section of the current time and a gain for a next section of the current time, corresponding to the output of the state machine 131.

The upper summer 139 performs subtraction of gains of a plurality of multiplexers.

The shift register 135 may perform a shift operation and then a division operation on an output of the summer.

The multiplier 136 multiplies the current time with the output of the shift register.

The left summer 137_1 adds a gain for a previous section to an output of the multiplier 136.

The right summer 137_2 adds an output of the left summer 137_1 and a previously calculated variable gain to calculate a variable gain to be used at the current time.

The storage 138 stores a variable gain to be used at the current time such that the stored variable gain is used for subsequent operations of the right summer 137_2.

A variable gain setting process of the gain controller 130 will be described below in a section $t_k \le t < t_{k+1}$ and a section $t_{k+1} \le t < t_{k+2}$.

▶ $t_k \le t < t_{k+1}$; A case in which the counter value is equal or less than dt The comparator 133 resets the counter 132 and supplies a signal to the state machine 131 when the output of the counter 132 is greater than a predetermined section length dt of the gain (here, $t_k$).

The counter 132 is reset to be 0 at time $t_k$, and the output indicates the current time. That is, the counter 132 outputs $t-t_k$.

The state machine 131 outputs an initial output Mux=0 at time $t_k$. Thus, the first multiplexer 134_1 outputs $\alpha_1$, and the second multiplexer 134_2 outputs $\alpha_2$.

The upper summer 139 adds a negative value of the output $\alpha_1$ of the first multiplexer 134_1 to the output $\alpha_2$ of the second multiplexer 134_2.

The shift register 135 receives $\alpha_2-\alpha_1$ and perform a shift operation to output $(\alpha_2-\alpha_1)/2^n$. However, since $(t_{k+1}-t_k)=2^n$, the output of the shift register may be $(\alpha_1-\alpha_2)/(t_{k+1}-t_k)$.

The multiplier 136 receives $(t-t_k)$ and $(\alpha_2-\alpha_1)/(t_{k+1}-t_k)$ and outputs $(\alpha_2-\alpha_1)/(t_{k+1}-t_k)\}\times(t-t_k)$.

The multiplier 137 receives $(t-t_k)$ and $(\alpha_2-\alpha_1)/(t_{k+1}-t_k)$ and outputs $(\alpha_2-\alpha_1)/(t_{k+1}-t_k)\}\times(t-t_k)$.

The right summer 137_2 adds the current input to an existing output prestored in the storage 138, that is, performs integration. Accordingly, the output of the right summer 137_2 is a right term except the static gain of Equation (2).

The storage 138 stores an output of the right summer 137_2 and allows the output to be used in subsequent operations.

The left summer 137_1 and the right summer 137_2 output respective integration values of $\{(\alpha_2-\alpha_1)/(t_{k+1}-t_k)\}\times(t-t_k)+\alpha_1\}$ and $\{(\alpha_2-\alpha_1)/(t_{k+1}-t_k)\}\times(t-t_k)+\alpha_1\}$, which vary with a change in an output of the counter 132 until the output of the counter 132 exceeds dt.

▶ $t_{k+1}\leq t<t_{k+2}$; A case in which the counter value is greater than dt

When the value of the counter 132 is greater than dt, the comparator 133 outputs a signal. In this case, the counter 132 is reset back to 0.

Thus, the state machine 131 recognizes the signal of the comparator 133 as a clock and then is state-transited to output Mux=1. In this case, the first multiplexer 134_1 and the second multiplexer 134_2 output $\alpha_2$ and $\alpha_3$, respectively.

However, since $t_{k+2}-t_{k+1}=t_{k-1}-t_k=dt$, an operation for a next section of Equation (2) is performed.

An example in which there are three gain sections will be described in FIG. 13. When the number of gain sections is greater than three, a structure of the gain controller 130 may be changed. For example, the gain controller 180 may include a greater number of multiplexers, each of which may have a different number of inputs or outputs.

As such, an embodiment of the present invention may be implemented using a shift register having a simple structure, instead of a divider having high complexity, by selecting a length of a section of a variable gain as one of powers of 2. Accordingly, it may be configured with a comparatively simple structure to reduce implementation cost and complexity.

Furthermore, an embodiment of the present invention may reduce an occurrence frequency of distortion in a position of an object due to a change in a variable gain curve.

According to an embodiment of the present invention, it is possible to improve existing limitations such as interference caused by an object having a great reflected signal (e.g., a remote wall) and influence caused by the exhaust gas and to increase robustness to the environment.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An object detection apparatus, comprising:
    an amplifier configured to amplify a reflected ultrasonic wave signal with a variable gain;
    a gain controller configured to set the variable gain such that the reflected ultrasonic wave signal received in at least one time zone is amplified with a higher gain, in comparison with other time zones;
    a comparator configured to compare a signal on an envelope corresponding to the signal amplified by the amplifier with a threshold and output the signal on the envelope, in response to the signal being greater than the threshold;
    a calculator configured to calculate an absolute value of a first-order differential value of the signal on the envelope, and a time at which a maximum of the absolute value of the first-order differential value is calculated; and
    a detector configured to detect an object using a third time, wherein the third time is a time at which the maximum is calculated, before a second time, and wherein the second time is a time at which the signal greater than the threshold is output,
    wherein the variable gain is a value on a gain curve formed by linearly interpolating a slope value of a gain, over each section of time, using a static gain, and
    wherein the static gain is an amplification gain of a reflected wave signal in the other time zones.

2. The object detection apparatus of claim 1, wherein the at least one time zone comprises a time zone in which there are reflected waves that are reflected from a target object intended to be sensed.

3. The object detection apparatus of claim 1, wherein the calculator comprises
    a subtractor configured to sequentially receive signals on the envelope and output a current differential signal, wherein the current differential signal is a result obtained by differentiating between a current input signal and a previous input signal,
    a first storage configured to store the previous input signal,
    a second storage configured to store a previous differential signal, the previous input signal being a result obtained by differentiating between the previous input signal and a signal before the previous input signal,
    a first comparator configured to, in response to the current differential signal being greater than the previous differential signal, output the current differential signal,
    a third storage configured to store a larger one of the previous differential signal and the current differential signal, and
    a fourth storage configured to store the third time,
    wherein the third time is a time at which the larger signal is stored, and
    wherein the third time is output in response to the comparator outputting the signal greater than the threshold.

4. The object detection apparatus of claim 3, further comprising a second comparator configured to, in response to the current differential signal having an offset, being added to the current differential signal, and being greater than the previous differential signal, reset the third time stored in the third storage.

5. The object detection apparatus of claim 1, wherein the gain controller is further configured to set a length of the section as a power of two.

6. The object detection apparatus of claim 1, wherein the gain controller is further configured to set the variable gain using a following equation:

$$\text{the gain} = \text{the static gain} + \int_{t_k}^{t_{k+1}} \left\{ \frac{\alpha(t_{k+1}) - \alpha(t_k)}{t_{k+1} - t_k}(t - t_k) + \alpha(t_k) \right\} dt.$$

where t is a current time, $t_k$ is a time corresponding to a previous section of the current time in the section, $t_{k+1}$ is a time corresponding to a next section in the section, $\alpha(t_k)$ is a slope value of a gain at time $t_k$, and $\alpha(t_{k+1})$ is a slope value of a gain at time $t_{k+1}$.

7. The object detection apparatus of claim 1, wherein the gain controller comprises
a counter configured to measure a current time and be reset, in response to the measured current time corresponding to a section length of a gain,
a comparator configured to output a signal and reset the counter, in response to the current time being greater than the section length;
a state machine configured to be state-transited upon recognizing the output of the comparator;
multiplexers each configured to output the gain, which comprises a gain for a previous section of the current time and a gain for a next section of the current time corresponding to the output of the state machine,
a subtractor configured to perform subtraction of the gain for the next section of the current time from the gain for the previous section of the current time output from the multiplexers;
a shift register configured to perform a shift operation on an output of the subtractor,
a multiplier configured to multiply the current time with an output of the shift register,
a first summer configured to add the gain for the previous section and an output of the multiplexers,
a second summer configured to add an output of the first summer and a previously calculated variable gain to calculate the variable gain to be used at the current time, and
a storage configured to store the variable gain to be used at the current time such that the variable gain is used for subsequent operations of the second summer.

8. An object detection method, comprising:
amplifying a reflected ultrasonic wave signal with a variable gain, wherein the reflected ultrasonic wave signal is amplified with a higher gain in at least one time zone in which there are reflected waves from an object intended to be sensed, compared to other time zones;
comparing a signal on an envelope corresponding to the amplified reflected wave signal with a threshold;
outputting the signal on the envelope, in response to the signal being greater than the threshold;
calculating a maximum of an absolute value of a first-order differential value of the signal on the envelope; and
detecting an object using a third time,
wherein the third time is a time at which the maximum is calculated, before a second time,
wherein the second time is a time at which the signal greater than the threshold is output,
wherein the variable gain is a value on a gain curve formed by linearly interpolating a slope value of a gain, over each section of time, using a static gain, and
wherein the static gain is an amplification gain of a reflected wave signal in the other time zones.

9. The object detection method of claim 8, wherein the variable gain is set using a following equation:

$$\text{the gain} = \text{the static gain} + \int_{t_k}^{t_{k+1}} \left\{ \frac{\alpha(t_{k+1}) - \alpha(t_k)}{t_{k+1} - t_k}(t - t_k) + \alpha(t_k) \right\} dt.$$

where t is a current time, $t_k$ is a time corresponding to a previous section of the current time in the section, $t_{k+1}$ is a time corresponding to a next section in the section, $\alpha(t_k)$ is a slope value of a gain at time $t_k$, and $\alpha(t_{k+1})$ is a slope value of a gain at time $t_{k+1}$.

10. The object detection method of claim 8, wherein the calculating comprises
sequentially receiving signals on the envelope and outputting a current differential signal, wherein the current differential signal is a result obtained by differentiating between a current input signal and a previous input signal,
storing the previous input signal in a first storage,
storing a previous differential signal in a second storage, the previous input signal being a result obtained by differentiating between the previous input signal and a signal before the previous input signal,
in response to the current differential signal being greater than the previous differential signal, outputting the current differential signal,
storing a larger one between the previous differential signal and the current differential signal in a third storage,
storing the third time in a fourth storage, wherein the third time is a time at which the larger signal is stored, and
outputting the third time, in response to the signal greater than the threshold being output.

11. The object detection method of claim 10, further comprising
adding the current differential signal to an offset, and
in response to the current differential signal with a offset added to the current differential signal being greater than the previous differential signal, resetting the third time stored in the third storage.

* * * * *